United States Patent
Taylor et al.

(10) Patent No.: US 11,695,988 B2
(45) Date of Patent: Jul. 4, 2023

(54) CONTENT STREAM HAVING ENCODED METADATA FOR VIDEO ENHANCEMENT

(71) Applicant: Disney Enterprises, Inc., Burbank, CA (US)

(72) Inventors: Alice Jane Taylor, Burbank, CA (US); Alexandra Christiansen, Van Nuys, CA (US); Steven M. Chapman, Newbury Park, CA (US); Jackson Rogow, Los Angeles, CA (US); Joseph Popp, Cerritos, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 17/377,164

(22) Filed: Jul. 15, 2021

(65) Prior Publication Data
US 2023/0016024 A1    Jan. 19, 2023

(51) Int. Cl.
*H04N 7/10* (2006.01)
*H04N 7/025* (2006.01)
*H04N 21/44* (2011.01)
*H04N 21/81* (2011.01)
*H04N 21/435* (2011.01)

(52) U.S. Cl.
CPC ..... *H04N 21/44016* (2013.01); *H04N 21/435* (2013.01); *H04N 21/8126* (2013.01)

(58) Field of Classification Search
CPC ........... H04N 21/44016; H04N 21/435; H04N 21/8126
See application file for complete search history.

(56) References Cited

U.S. PATENT DOCUMENTS

| | | | |
|---|---|---|---|
| 9,756,381 B2* | 9/2017 | Oh | H04N 21/4622 |
| 9,811,878 B1* | 11/2017 | Garg | G06T 3/40 |
| 11,218,765 B2* | 1/2022 | Eyer | H04N 21/23614 |
| 2008/0092210 A1* | 4/2008 | Tobita | G11B 20/00731 726/2 |
| 2010/0158099 A1* | 6/2010 | Kalva | H04N 21/23412 375/240.01 |
| 2011/0321084 A1* | 12/2011 | Takahashi | H04N 5/2723 725/32 |
| 2016/0241865 A1* | 8/2016 | Malone | H04N 19/46 |
| 2018/0262745 A1* | 9/2018 | Cole | H04N 13/183 |
| 2019/0342522 A1* | 11/2019 | Garrido | H04M 1/72439 |

* cited by examiner

*Primary Examiner* — Gigi L Dubasky
(74) *Attorney, Agent, or Firm* — Farjami & Farjami LLP

(57) ABSTRACT

A system for providing default content enhanced with supplemental content includes processing hardware and a memory storing a software code. The processing hardware executes the software code to receive a content stream including multiple video frames, a first video frame of the multiple video frames including first default content, first supplemental content, and first encoded metadata, and to decode the first encoded metadata of the first video frame to produce first decoded metadata. The processing hardware further executes the software code to select, using the first decoded metadata, at least a first portion of the first supplemental content for use in enhancing the first default content, transfer, using the first decoded metadata, the selected first portion of the first supplemental content to one or more predetermined locations in the first default content to produce an enhanced first video content, and output the enhanced first video content to a display device.

20 Claims, 5 Drawing Sheets

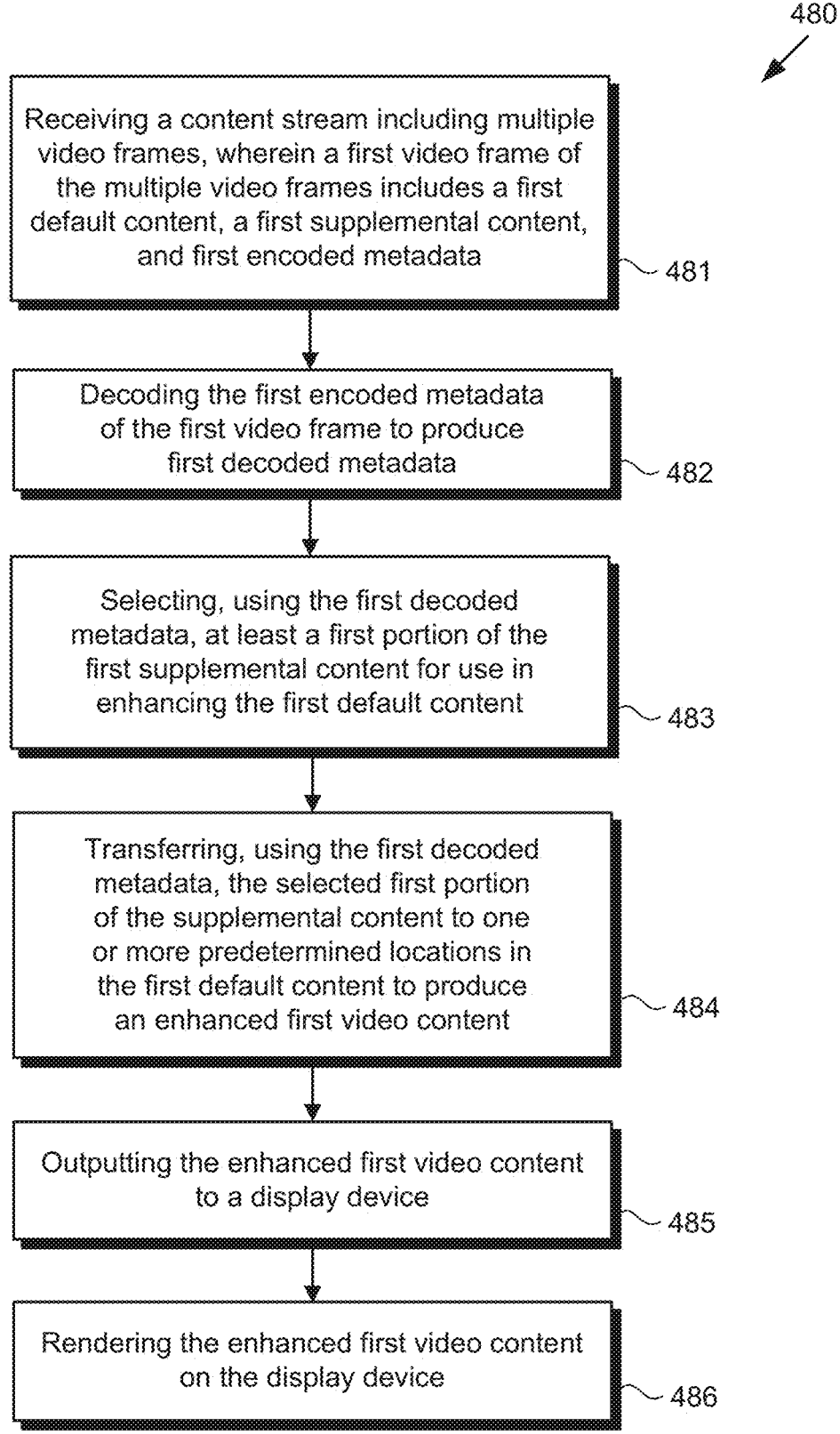

CONTENT STREAM HAVING ENCODED METADATA FOR VIDEO ENHANCEMENT

BACKGROUND

Video content that enables user interactivity typically requires multiple starts and stops of video playback in order to make changes to the content. For example, a version of a video in which the user can change the language spoken by the characters typically requires pausing of the video in order to select the change, and then starting a different video stream with the alternate language content. Analogously, enabling user control of creative aspects of storytelling, such as alterations to lighting or color, or triggering of special effects, are virtually impossible to implement in a simple consumer playback platform that requires multiple playback stops and starts to effectuate the user desired creative changes.

In order to provide supplemental content, such as subtitles or interactive content, for use with primary content distributed to users, two data streams, a primary content stream and a supplemental content stream, are typically sent to the playback device of the user. The playback device must then synchronize the primary content, e.g., the primary video file, and the supplemental content, e.g., side car data files. Such synchronization can require considerable processing power, especially in the case of interactive content that contains complex rendering data that would require advanced GPUs to concurrently process and synchronize the rendering data with the playback of the primary content. This undesirably prevents users of many widely distributed playback devices from enjoying advanced forms of interactive content.

BRIEF DESCRIPTION OF THE DRAWINGS

FIG. 4 shows a flowchart presenting an exemplary method for use by a system for providing default content enhanced by supplemental content, according to one implementation.

DETAILED DESCRIPTION

Figure 1:
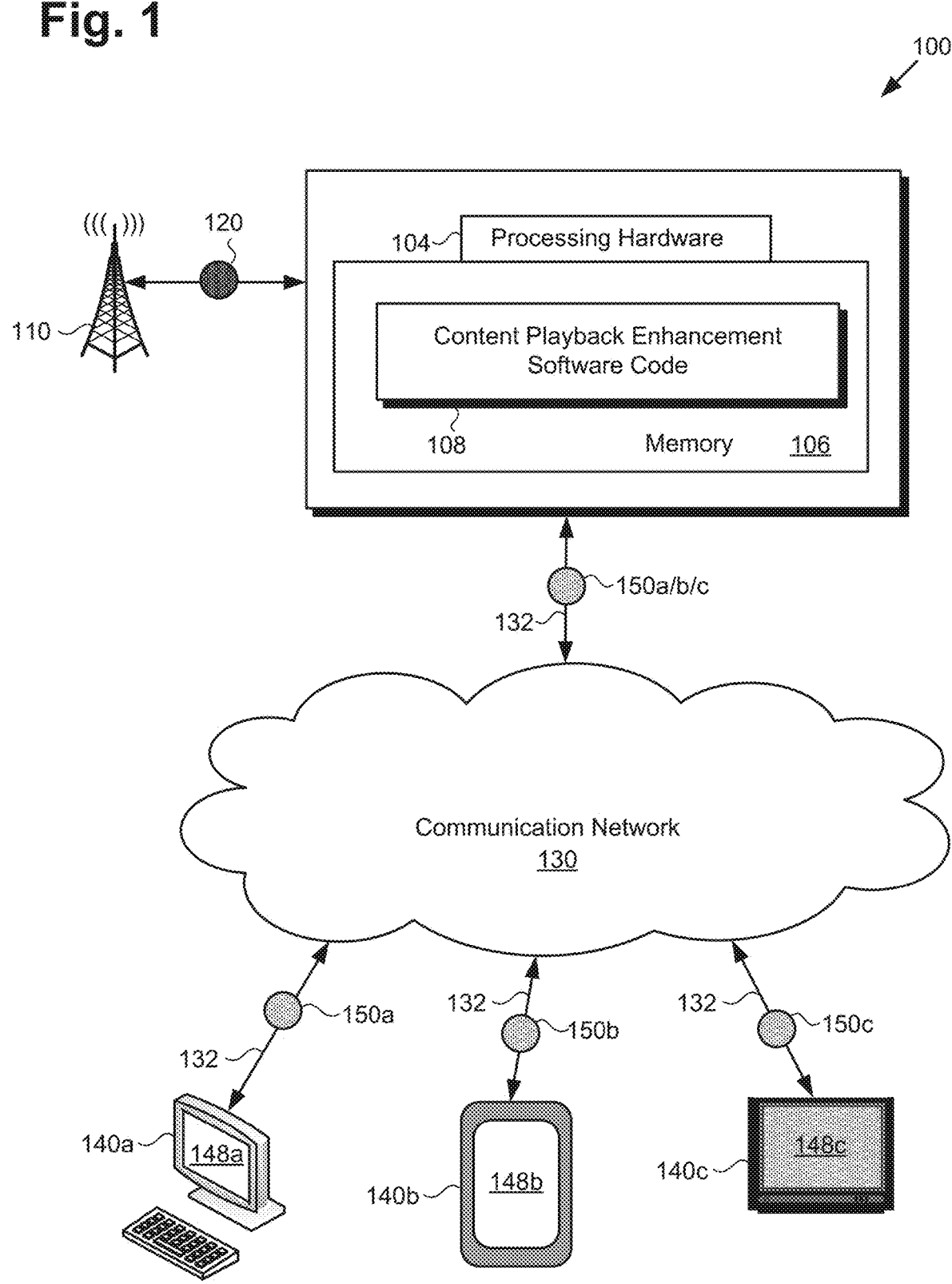
FIG. 1 shows an exemplary system for providing default content enhanced by supplemental content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing enhanced video content. It is noted that although the present content enhancement solution is described below in detail by reference to specific examples of supplemental content suitable for use in enhancing base or default video, the present novel and inventive principles may also be applied to content enhancement through the use of an entire suite of enhancement features. Examples of such enhancement features include assisted audio, forced narratives, subtitles, captioning, and modified character mouth movements based on user selected spoken language, to name a few. Moreover, in some implementations, the systems and methods disclosed by the present application may be substantially or fully automated.

As used in the present application, the terms "automation," "automated", and "automating" refer to systems and processes that do not require the participation of a human analyst or editor. Although, in some implementations, a human system administrator may sample or otherwise review the content distributed by the automated systems and according to the automated methods described herein, that human involvement is optional. Thus, the methods described in the present application may be performed under the control of hardware processing components of the disclosed automated systems.

By wary of overview, the present content enhancement solution merges supplemental content for enhancing default content, and encoded metadata describing its use to enhance the default content with the default content itself in a way that enables the supplemental content and encoded metadata to survive most video processing techniques, including editing and compression. The present solution ensures supplemental content and metadata retention by incorporating those assets into the same frame of video shared by the default content, rather than providing them within a codec container as a separate content stream. This approach makes it possible to ensure preservation of supplemental audio, visual effects such as lens data and color correction lookup tables (LUTs), or content tracking information, for example. Moreover, the present content enhancement solution may advantageously be implemented using low cost, low processing capacity, in-home media players when a bit-block technique (blitting) is used to transfer the supplemental content onto the default content on a per-frame basis.

The present content enhancement solution allows for anamorphic or variable aspect ratio content to be contained within a video frame that may be streamed at a resolution independent of the display resolution of an end user display device. Including the metadata for synchronizing supplemental content with default content in a shared video frame, rather than providing that metadata in a separate container, advantageously ensures that the supplemental content is accessible in use cases in which streaming data rates are variable. In addition, including the default content, supplemental content, and metadata in the same video frame has the added benefit of disrupting content piracy because any analog-hole capture will lose interactive capabilities, while a pirated copy of the content file would playback the entire contents of each frame, i.e., the default content, all supplemental content, and the encoded metadata, together. Moreover, the video frames holding the supplemental content and encoded metadata together with the default content are inherently resistant to automated copying because the aspect ratio of each frame can be variable.

The encoded metadata instructions for enhancing the default content are designed to remain readable even if the resolution of the streamed content is reduced due to network bandwidth issues. The encoded metadata can be placed in an order that allows queuing of instructions. That is to say, in some implementations, the instructions for enhancing default content in a particular frame may be included in a previous frame, thereby enabling the playback device to "anticipate" the enhancement process for an upcoming frame.

Thus, implementations of the content enhancement solution disclosed in the present application may include encoding video frame metadata to include information that can survive streaming bandwidth issues without needing to modify Moving Pictures Expert Group (MPEG) standards of multi-channel data inclusion. In addition, various implementations of the present solution may also include decoding and reading the encoded metadata in each frame to establish available interactivity options, determining whether a user's media player has requested interaction capability, and bit-block transferring supplemental content included in the video frame as overlay data to modify the default content included in the same video frame.

FIG. 1 shows exemplary system 100 for providing default content enhanced by supplemental content, according to one implementation. As shown in FIG. 1, system 100 includes processing hardware 104 and memory 106 implemented as a computer-readable non-transitory storage medium. According to the present exemplary implementation, memory 106 stores content playback enhancement software code 108.

As further shown in FIG. 1, system 100 is implemented within a use environment including content broadcast source 110 providing content stream 120 to system 100. As depicted in FIG. 1, in some use cases, content broadcast source 110 may find it advantageous or desirable to make content stream 120 available via an alternative distribution channel, such as communication network 130, which may take the form of a packet-switched network, for example, such as the Internet. For instance, system 100 may be utilized by content broadcast source 110 to distribute enhanced video content produced from content stream 120 as enhanced video content streams 150a, 150b, and 150c, which may be Internet Protocol (IP) content stream provided by a streaming service, or a video-on-demand (VOD) service, for example, to respective media player equipped user systems 140a, 140b, and 140c (hereinafter "user systems 140a-140c").

Also shown in FIG. 1 are network communication links 132 of communication network 130 interactively connecting system 100 with user systems 140a-140c, and displays 148a, 148b, and 148c (hereinafter "displays 148a-148c") of respective user systems 140a-140c. As discussed in greater detail below, enhanced video content streams 150a, 150b, and 150c (hereinafter "enhanced video content streams 150a-150c") include default content included in each frame of content stream 120 as well as well as supplemental content also included in each same frame of content stream 120 and used to enhance the default content for display on displays 148a-148c.

Although the present application refers to content playback enhancement software code 108 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of system 100 or the processing hardware of respective user systems 140a-140c (processing hardware of user systems 140a-140c not shown in FIG. 1).

Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Processing hardware 104 may include multiple hardware processing units, such as one or more central processing units and one or more graphics processing units, for example. By way of definition, as used in the present application, the terms "central processing unit" (CPU) and "graphics processing unit" (GPU) have their customary meaning in the art. That is to say, a CPU includes an Arithmetic Logic Unit (ALU) for carrying out the arithmetic and logical operations of system 100 or user systems 140a-140c, as well as a Control Unit (CU) for retrieving programs, such as content playback enhancement software code 108, from memory 106, while a GPU may be implemented to reduce the processing overhead of the CPU by performing computationally intensive graphics or other processing tasks.

Although FIG. 1 depicts system 100 as being instantiated on a single computing platform, more generally, system 100 may include one or more computing platforms, such as computer servers for example, which may be co-located or form an interactively linked but distributed system, such as a cloud-based system, for instance. As a result, processing hardware 104 and memory 106 may correspond to distributed processor and memory resources within system 100. In one such implementation, system 100 may correspond to one or more web servers accessible over a packet-switched network such as the Internet, for example. Alternatively, system 100 may correspond to one or more computer servers supporting a wide area network (WAN), a local area network (LAN), or included in another type of private or limited distribution network. In addition, or alternatively, in some implementations, system 100 may be implemented virtually, such as in a data center. For example, in some implementations, system 100 may be implemented in software, or as virtual machines.

It is further noted that, although user systems 140a-140c are shown variously as desktop computer 140a, tablet computer 140b, and smart television (smart TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 130, and implement the functionality ascribed to user systems 140a-140c herein. That is to say, in other implementations, one or more of user systems 140a-140c may take the form of a laptop computer, digital media player, game console, smart toy, smartphone or a wearable communication device such as a smartwatch, to name a few examples. It is also noted that displays 148a-148c may take the form of liquid crystal displays (LCDs), light-emitting diode (LED) displays, organic light-emitting diode (OLED) displays, quantum dot (QD) displays, or any other suitable display screens that perform a physical transformation of signals to light.

In one implementation, content broadcast source 110 may be a media entity providing content stream 120. Content stream 120 may include audio-video (AV) content from a movie or linear TV program stream, for example. According to the present novel and inventive concepts, each video frame of content stream 120 may include standard definition (SD), high-definition (HD) or ultra-HD (UHD) default content with embedded supplemental content in the form of audio, captions, special effects, alternative imagery and performative features such as mouth movements and gestures by characters, and encoded metadata instructions for enhancing the default content with the supplemental content, as well as time code, and other ancillary metadata, such as ratings or parental guidelines. In some implementations, content stream 120 may utilize secondary audio programming (SAP) or Descriptive Video Service (DVS), for example. Alternatively, in some implementations, content stream 120 may be video game content including default content, supplemental content, and encoded metadata instructions for enhancing the default content using the supplemental content.

Content broadcast source 110 may take the form of a conventional cable or satellite TV network, for example. As noted above, content broadcast source 110 may find it advantageous or desirable to make content stream 120 available via an alternative distribution channel, such as communication network 130, which may take the form of a packet-switched network, for example, such as the Internet. For instance, and as also noted above, system 100 may be utilized by content broadcast source 110 to distribute enhanced video content streams 150a-150c corresponding to content stream 120 as IP content streams provided by a streaming service, or by a VOD service.

Figure 2:
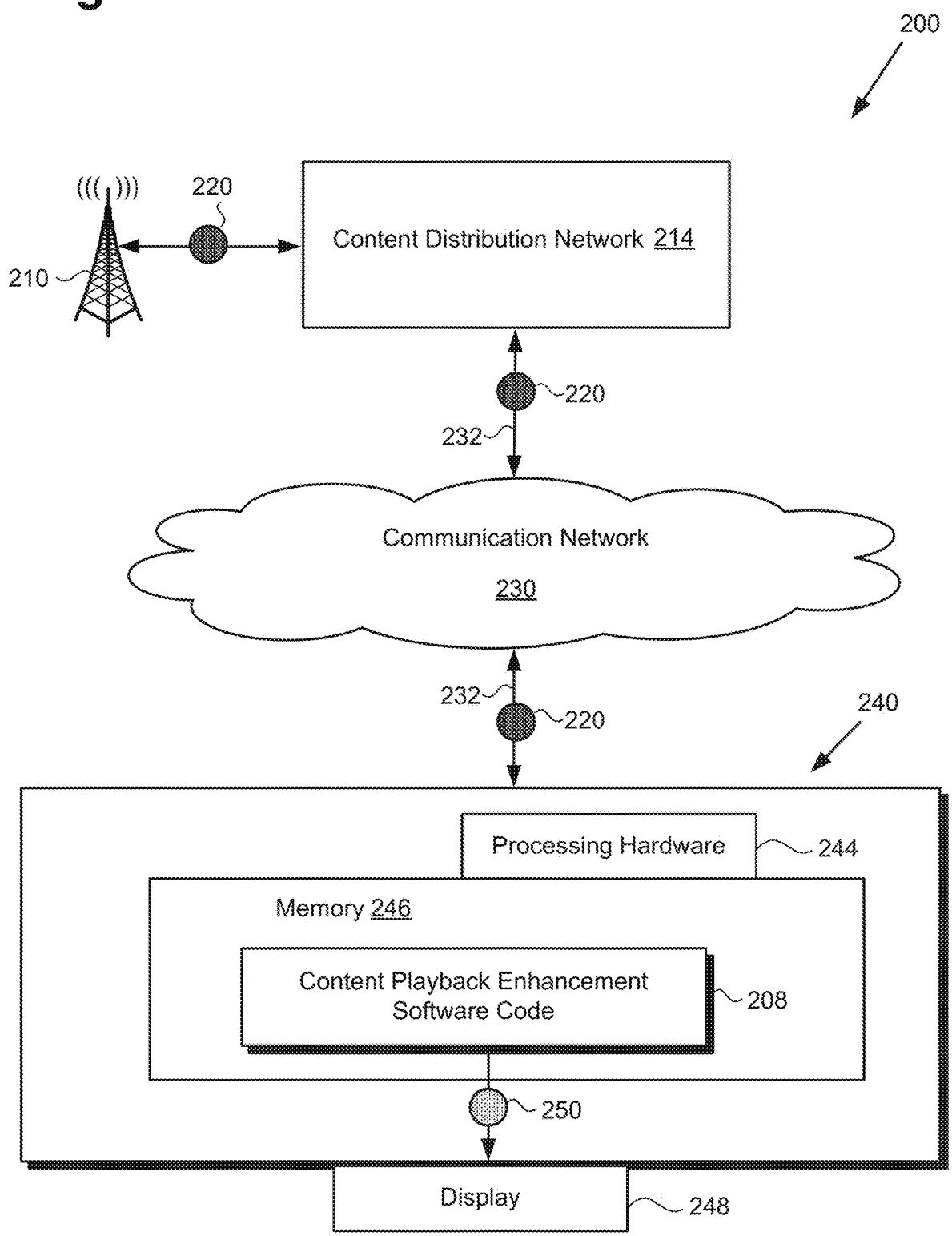
FIG. 2 shows an exemplary system for providing default content enhanced by supplemental content, according to another implementation.

FIG. 2 shows user system 240 for providing default content enhanced by supplemental content, according to another implementation. As shown in FIG. 2, user system 240 includes processing hardware 244, memory 246 implemented as a computer-readable non-transitory storage medium storing content playback enhancement software code 208, and display 248. It is noted that, in various implementations, display 248 may be physically integrated with user system 240 or may be communicatively coupled to but physically separate from user system 240. For example, where user system 240 is implemented as a smartphone, laptop computer, or tablet computer, display 248 will typically be integrated with user system 240. By contrast, where user system 240 is implemented as a desktop computer, display 248 may take the form of a separate monitor.

As further shown in FIG. 2, user system 240 is utilized in use environment 200 including content broadcast source 210 providing content stream 220 to content distribution network 214, which in turn distributes content stream 220 to user system 240 via communication network 230 and network communication links 232. According to the implementation shown in FIG. 2, content playback enhancement software code 208 stored in memory 246 of user system 240 is configured to receive content stream 220 and to output enhanced video content stream 250 for display on user system display 248.

Content broadcast source 210, content stream 220, communication network 230, and network communication links 232 correspond respectively in general to content broadcast source 110, content stream 120, communication network 130, and network communication links 132, in FIG. 1. In other words, content broadcast source 210, content stream 220, communication network 230, and network communication links 232 may share any of the characteristics attributed to respective content broadcast source 110, content stream 120, and network communication links 132 by the present disclosure, and vice versa. In addition, enhanced video content stream 250, in FIG. 2, corresponds in general to any or all of enhanced video content streams 150a-150c, in FIG. 1. Thus, enhanced video content stream 250 may share any of the characteristics attributed to corresponding enhanced video content streams 150a-150c by the present disclosure, and vice versa.

User system 240 and display 248 correspond respectively in general to any or all of user systems 140a-140c and respective displays 148a-148c in FIG. 1. Thus, user systems 140a-140c and displays 148a-148c may share any of the characteristics attributed to respective user system 240 and display 248 by the present disclosure, and vice versa. That is to say, like displays 148a-148c, display 248 may take the form of an LCD, LED display, OLED display, or QD display, for example. Moreover, although not shown in FIG. 1, each of user systems 140a-140c may include features corresponding respectively to processing hardware 244, and memory 246 storing content playback enhancement software code 208. Furthermore, processing hardware 244 of user system 240 may include multiple hardware processing units, such as one or more CPUs and one or more GPUs for example, as those features are defined above.

Content playback enhancement software code 208 corresponds in general to content playback enhancement software code 108, in FIG. 1, and is capable of performing all of the operations attributed to content playback enhancement software code 108 by the present disclosure. In other words, in implementations in which processing hardware 244 of user system 240 executes content playback enhancement software code 208 stored locally in memory 246, user system 240 may perform any of the actions attributed to system 100 by the present disclosure. Thus, in some implementations, content playback enhancement software code 208 executed by processing hardware 244 of user system 240 may receive content stream 220 and may output enhanced video content stream 250 corresponding to content stream 220 to display 248.

Figure 3A:
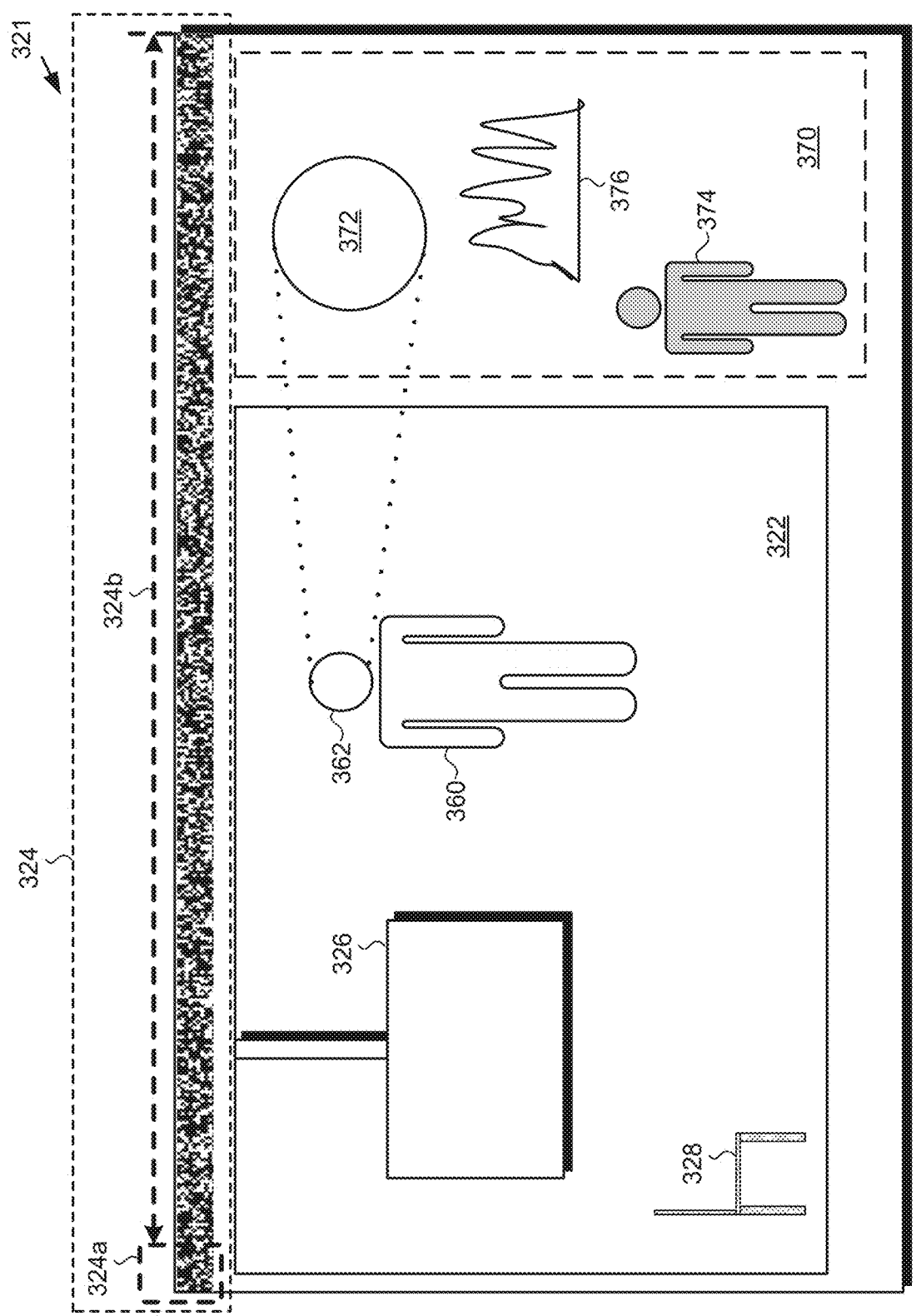
FIG. 3A shows an exemplary video frame including default content, supplemental content, and encoded metadata, according to one implementation

FIG. 3A shows exemplary video frame 321 including default content 322, supplemental content 370, and encoded metadata 324, according to one implementation. According to the exemplary implementation shown in FIG. 3A, default content 322 may include images of objects such as fireplace 326 and unoccupied chair 328 adjacent to fireplace 326. In addition, default content 322 may include character 360, which may be an animated character or an image depicting a human actor, for example, which includes facial features 362. As further shown in FIG. 3A, supplemental content 370 may include ghostly image 374, image of flames 376, and alternate facial features 372 for character 360. It is noted that alternate facial features 372 for character 360 may have a different display resolution, i.e., a higher or lower display resolution, than facial features 362 included in default content 322.

It is further noted that the specific features depicted as being included default content 322 and supplemental content 370 are provided merely in the interests of conceptual clarity and are not to be interpreted as limiting. In other implementations, default content 322 may include a wide variety of other images in addition to, or in lieu of, fireplace 326 and chair 328. For example, in other implementations, default content 322 may include a background depicting an indoor or outdoor venue, as well as images of other furnishings, vehicles, artworks, and other types of props.

Moreover, in other implementations, supplemental content 370 may include other images in addition to, or in lieu of ghostly image 374, flames 376, and alternate facial features 372 for character 360. For instance, in addition to, or as alternatives to ghostly image 374, flames 376, and alternate facial features 372 for character 360, supplemental content 370 may include special effects, or "behind-the-scenes" performances by characters recorded against a green screen, blue screen, or other virtual production background. In addition, or alternatively, supplemental content 370 may include features other than images, such as one or more of supplemental audio tracks providing assisted audio, or dialogue in an alternative spoken language selectable by a user, modified character mouth movements to correspond to the user selected language, forced narratives, subtitles, and captioning to name a few examples. As noted above by reference to alternate facial features 372 for character 360, where supplemental content 370 includes images of objects or characters, those images may have a higher, or lower display resolution than images included in default content 322.

With respect to encoded metadata 324, it is noted that in some implementations, as shown in FIG. 3A, encoded metadata 324 may be embedded in its entirety at a border of video frame 321, such as a top border, bottom border, or right or left vertical border, and may be embedded at substantially the same location in each video frame of content stream 120/220. However, in other implementations, encoded metadata 324 may include header portion 324a specifying the location of body portion 324b of encoded metadata 324 in video frame 321. For example, in some implementations, header portion 324a of encoded metadata 324 may be embedded in substantially the same location in each video frame of content stream 120/220 while body portion 324b may be randomly located in each video frame on a per-frame basis.

Encoded metadata 324 may take the form of binary code, for example, specifying the particular items of supplemental content 370 available for use to enhance default content 322, their storage locations within video frame 321, and the predetermined insertion location for each item of supplemental content 370 within default content 322. For example, encoded metadata 324 may describe the bounding box within video frame 321 of each item of supplemental content 370, as well as the bounding box for placement of each item of supplemental content 370 within default content 322. It is noted that in some implementations, the locations of default content 322 and supplemental content 370 within video frame 321 can be varied on a per-frame basis thereby advantageously foiling unauthorized copying of content stream 120/220 or other forms of content piracy.

It is further noted that content stream 120/220 typically includes multiple video frames, each of which may be represented by video frame 321. That is to say, video frame 321 may correspond to a first video frame of content stream 120/220, a second video frame of content stream 120/220, a third video frame of content stream 120/220, and so forth. Each video frame 321 of content stream 120/220 will typically include default content 322, supplemental content 370, and encoded metadata 324. However, the specific features of default content 322, supplemental content 370, and encoded metadata 324 will typically vary from frame-to-frame. Moreover, as discussed above, one or more of default content 322, supplemental content 370, and body portion 324b of encoded metadata 324 may have its/their position(s) within video frame 321 varied on a per-frame basis.

Figure 3B:
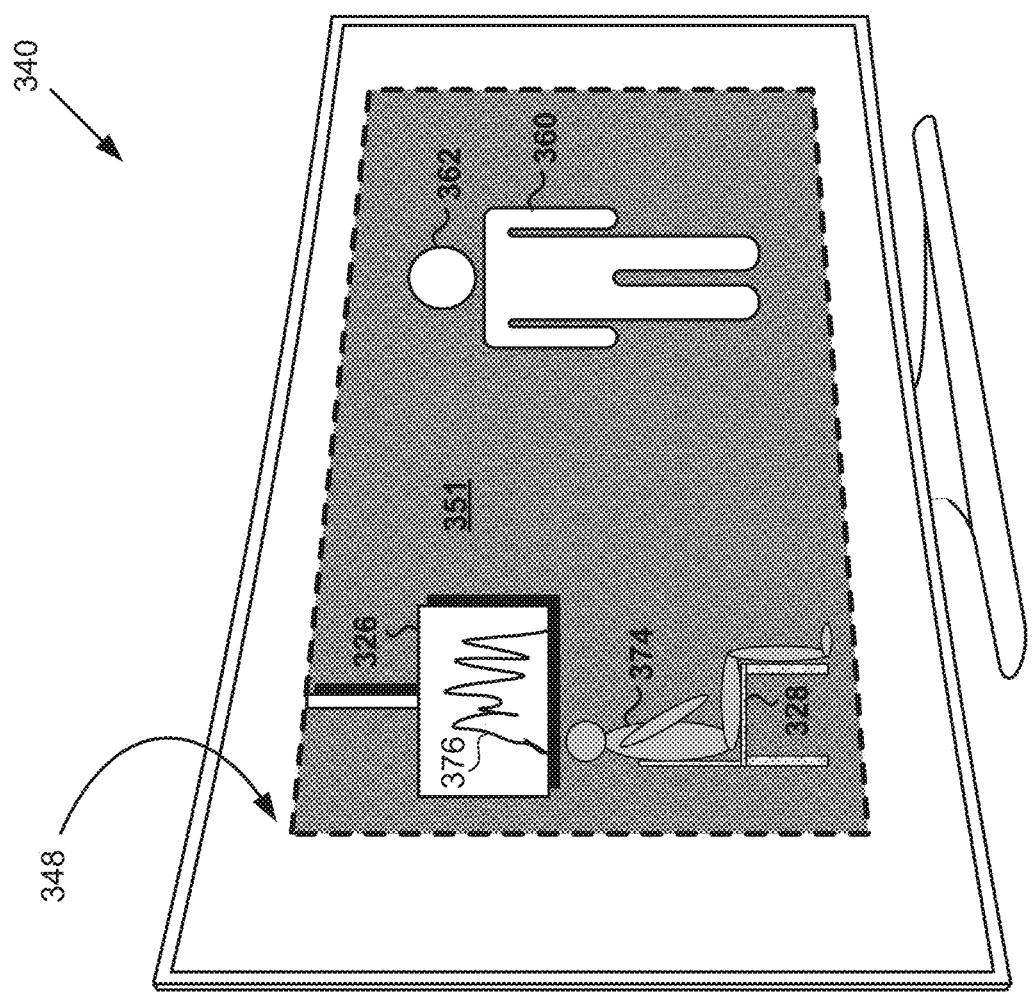
FIG. 3B shows exemplary enhanced video content including default content enhanced by supplemental content, according to one implementation.

FIG. 3B shows exemplary enhanced video content 351 including default content 322, in FIG. 3A, enhanced by a portion of supplemental content 370 in that previous figure, according to one implementation. As shown in FIG. 3B, enhanced video content 351 includes default content items fireplace 326 and chair 328, as well as character 360 having default facial features 362. However and as further shown by FIG. 3B, enhanced video content 351 includes some features selected from supplemental content 370. According to the exemplary use case shown in FIG. 3B, for example, flames 376 are present in formerly cold fireplace 326 to show that fireplace 326 is presently in use, while unoccupied chair 328 of default content 322 is shown to be occupied in enhanced video content 351 by ghostly image 374. As further shown in FIG. 3B, enhanced video content 351 is rendered on display 348 of user system 340.

User system 340 and display 348 correspond respectively in general to user system(s) 140a-140c/240 and display(s) 148a-148c/248 in FIGS. 1 and 2. As a result, user system 340 and display 348 may share any of the characteristics attributed to respective user system(s) 140a-140c/240 and display(s) 148a-148c/248 by the present disclosure, and vice versa. That is to say, like display(s) 148a-148c/248, display 348 may take the form of an LCD, LED display, OLED display, QD display, or any other suitable display screen that performs a physical transformation of signals to light. In addition, although not shown in FIG. 3B, user system 340 may include features corresponding respectively to processing hardware 244 and memory 246 storing content playback enhancement software code 208, in FIG. 2.

It is noted that enhanced video content stream(s) 150a-150c/250 typically include multiple frames each enhanced video content, each of which may be represented by enhanced video content 351. That is to say, enhanced video content 351 may correspond to a first video frame of enhanced video content stream(s) 150a-150c/250, a second video frame of enhanced video content stream(s) 150a-150c/250, a third video frame of enhanced video content stream(s) 150a-150c/250, and so forth. Each video frame of enhanced video content stream(s) 150a-150c/250 will typically include some combination of default content 322 and supplemental content 370. However, the specific features of default content 322 and supplemental content 370 included in enhanced video content will typically vary from frame-to-frame of enhanced video content stream(s) 150a-150c/250.

The functionality of content playback enhancement software code 108/208 will be further described by reference to FIG. 4. FIG. 4 shows flowchart 480 presenting an exemplary method for use by a system for providing default content enhanced by supplemental content, according to one implementation. With respect to the method outlined in FIG. 4, it is noted that certain details and features have been left out of flowchart 480 in order not to obscure the discussion of the inventive features in the present application.

Referring to FIG. 4, with further reference to FIGS. 1, 2, and 3A, flowchart 480 may begin with receiving content stream 120/220 including multiple video frames each corresponding to video frame 321, wherein a first video frame of the multiple video frames includes first default content corresponding to default content 322, first supplemental content corresponding to supplemental content 370, and first encoded metadata corresponding to encoded metadata 324 (action 481). Referring to FIG. 1, in some implementations, content stream 120 may be received from content broadcast source 110, in action 481, by content playback enhancement software code 108, executed by processing hardware 104 of system 100. However, referring to FIG. 2, in other implementations content stream 220 may be received by content playback enhancement software code 208, executed by processing hardware 244 of user system 240, via communication network 230 and network communication links 232.

Flowchart 480 further includes decoding the first encoded metadata of the first video frame to produce a first decoded metadata (action 482). As noted above by reference to FIG. 3A, encoded metadata 324 may take the form of binary code, for example, specifying the particular items of supplemental content 370 available for use to enhance default content 322, their storage locations within video frame 321, and the predetermined insertion location for each item of supplemental content 370 within default content 322. For instance, and as also noted above, encoded metadata 324 may describe the bounding box within video frame 321 of each item of supplemental content 370, as well as the bounding box for placement of each item of supplemental content 370 within default content 322. Referring to FIG. 1, in some implementations, encoded metadata 324 may be decoded in action 482 by content playback enhancement software code 108, executed by processing hardware 104 of system 100. However, referring to FIG. 2, in other implementations encoded metadata 324 may be decoded in action 482 by content playback enhancement software code 208, executed by processing hardware 244 of user system 240.

Flowchart 480 further includes selecting, using the first decoded metadata produced in action 482, at least a first portion of the first supplemental content included in the first video frame for use in enhancing the first default content (action 483). For example, as shown by FIGS. 3A and 3B, in one use case, the portion of supplemental content 370 including ghostly image 374 and flames 376 are selected for use in enhancing default content 322, while alternate facial features 372 for character 360 are not. Referring to FIG. 1, in some implementations, the first portion of supplemental content 370 may be selected in action 483 by content playback enhancement software code 108, executed by processing hardware 104 of system 100. However, referring to FIG. 2, in other implementations the first portion of supplemental content 370 may be selected by content playback enhancement software code 208, executed by processing hardware 244 of user system 240.

In some implementations the first portion of supplemental content 370 selected in action 483 may be selected based on a display property of the display device used to display enhanced video content 351. For example, in the implementation shown in FIG. 1, processing hardware 104 of system 100 may execute content playback enhancement software code 108 to obtain data describing the display properties or capabilities of respective user systems 140a-140c, and may select supplemental content 370 for inclusion in enhanced video content 351 based on those constraints. Display properties upon which selection of the first portion of supplemental content 370 may be based in action 483 can include one or more of display resolution and aspect ratio, for example.

Referring to FIG. 2 the first portion of supplemental content 370 selected in action 483 may be selected by content playback enhancement software code 208, executed by processing hardware 244 of user system 240 based on known display properties of display 248. In addition, or alternatively, in some implementations, the first portion of supplemental content 370 selected in action 483 may be selected based on input received from a user of user system(s) 140a-140c/240. For example, the user may utilize an input device of user system(s) 140a-140c/240, such as a keyboard, touchscreen, voice command unit, or remote control device, for example, to select from among optional supplemental content shown or listed on respective display(s) 148a-148c/248.

Flowchart 480 further includes transferring, using the first decoded metadata produced in actin 482, the first portion of the first supplemental content selected in action 483 to one or more predetermined locations in the first default content to produce an enhanced first video content corresponding to enhanced video content 351 (action 484). In some implementations, as depicted in FIG. 1, transfer of a portion of supplemental content 370 to default content 322 may be performed by content playback enhancement software code 108, executed by processing hardware 104 of system 100, based on the predetermined locations for placement of supplemental content 370 in default content 322 identified in encoded metadata 324.

Moreover, as noted above, in some implementations, the present content enhancement solution advantageously enables performance of action 484 by lower end playback devices, such as low cost, low processing capacity in-home media players when a bit-block technique, also known in the art as "blitting," "bit blit," or "bit block transfer," is used to transfer supplemental content 370 onto default content 322 on a per-frame basis. Thus, in some implementations, as depicted in FIG. 2, transfer of a portion of supplemental content 370 to default content 322 may be performed by content playback enhancement software code 208, executed by processing hardware 244 of user system 240, based on the predetermined locations for placement of supplemental content 370 in default content 322 identified in encoded metadata 324.

As noted above, in some implementations, the instructions for enhancing default content 322 in a particular video frame may be included in a previous frame, thereby enabling the playback system to "anticipate" the enhancement process for an upcoming frame. That is to say, in some implementations, the first encoded metadata in the first video frame may include instructions for modifying a second, or subsequent, video frame of the multiple video frames included in content stream 120/220.

Flowchart 480 further includes outputting the enhanced first video content to a display device (action 485). Referring to FIG. 1, in some implementations, action 485 may be performed by content playback enhancement software code 108, executed by processing hardware 104 of system 100, by streaming enhanced video content streams 150a-150c including the enhanced first video content to respective user systems 140a-140c having respective display 148a-148c. Referring to FIG. 2, in some implementations, the first enhanced video content may be output as part of enhanced video content stream 250 to display 248 of user system 240 by content playback enhancement software code 208, executed by processing hardware 244.

As noted above, content stream 120/220 typically includes multiple video frames. Thus, some or all of actions 481, 482, 483, 484, and 485 of flowchart 480 (hereinafter "actions 481-485") may be repeated on a per-frame bases for each video frame included in content stream 120/220. For example, although not expressly shown in FIG. 4, processing hardware 104 of system 100 may further execute content playback enhancement software code 108, or processing hardware 244 of user system 240 may further execute playback enhancement software code 208, to decode a second encoded metadata of a second video frame to produce a second decoded metadata, select, using the second decoded metadata, at least a second portion of a second supplemental content for use in enhancing the second default content, transfer, using the second decoded metadata, the selected second portion of the second supplemental content to one or more predetermined locations in the second default content to produce an enhanced second video content, and output the enhanced second video content to the display device to which the enhanced first video content is output in action 485.

It is noted that in implementations in which the system performing the method outlined by flowchart 480 includes the display device, e.g., user system 240/340 including display 248/348, flowchart 480 may further include rendering the enhanced first video content, as well as subsequent enhanced video content, on display 248/348 (action 486). Action 486 may be performed by processing hardware 244 of user system 240/340. With respect to the method outlined by flowchart 480, it is emphasized that, in some implementations, actions 481-485, or actions 481-485 and 486, may be performed in an automated process from which human involvement may be omitted.

Thus, the present application discloses systems and methods for providing enhanced video content. The novel and inventive concepts disclosed by the present application include embedding supplemental content and encoded metadata providing instructions for use of the supplemental content into the main video stream itself and within the relevant frames that the supplemental content is meant to enhance. Such embedding of the encoded metadata and supplemental content advantageously eliminates any need for a sidecar data channel and additionally eliminates any need to perform computationally expensive synchronization tasks. The present content enhancement solution further advantageously presents low technical barriers to adoption due to its being readily implemented into playback software. Furthermore, the present content enhancement solution enables the use of advanced interactive content on lower end playback devices that would otherwise lack interactive capability under the constraints imposed by the present state-of-the-art. Because substantially all existing video players have the capability to perform a bit-block transfer process sufficient to enhance default content with supplemental content, as described above, the present content enhancement solution is highly scalable and adoptable.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a processing hardware and a memory storing a software code;
   the processing hardware configured to execute the software code to:
   receive a content stream including a plurality of video frames each having at least one of a default content or a supplemental content, and encoded metadata including a metadata header portion and a metadata body portion, wherein the metadata header portion is embedded in same location within each of the plurality of video frames, wherein the metadata body portion is randomly located within each of the plurality of video frames on a per-frame basis, and wherein a first video frame of the plurality of video frames includes a first default content, a first supplemental content, and first encoded metadata;
   decode the first encoded metadata of the first video frame to produce a first decoded metadata;
   select, using the first decoded metadata, at least a first portion of the first supplemental content for use in enhancing the first default content;
   transfer, using the first decoded metadata, the selected first portion of the first supplemental content to one or more predetermined locations in the first default content to produce an enhanced first video content; and
   output the enhanced first video content to a display device.

2. The system of claim 1, wherein the first portion of the first supplemental content is selected based on a display property of the display device.

3. The system of claim 2, wherein the display property comprises at least one of a display resolution or an aspect ratio of the display device.

4. The system of claim 1, wherein the first portion of the first supplemental content is selected based on an input received from a user of the display device.

5. The system of claim 1, wherein the first encoded metadata is a binary code.

6. The system of claim 1, further comprising the display device, and wherein the processing hardware is further configured to render the enhanced first video content on the display device.

7. The system of claim 1, wherein the system is one of a tablet computer, a smart toy, a smartphone, or a wearable communication device.

8. The system of claim 1, wherein the first encoded metadata include instructions for modifying a second video frame of the plurality of video frames.

9. The system of claim 1, wherein a second video frame of the plurality of video frames includes a second default content, a second supplemental content, and second encoded metadata, and wherein the processing hardware is further configured to execute the software code to:
   decode the second encoded metadata of the second video frame to produce a second decoded metadata;
   select, using the second decoded metadata, at least a second portion of the second supplemental content for use in enhancing the second default content;
   transfer, using the second decoded metadata, the selected second portion of the second supplemental content to one or more predetermined locations in the second default content to produce an enhanced second video content; and
   output the enhanced second video content to the display device.

10. The system of claim 1, wherein the processing hardware is further configured to execute the software code to transfer the selected first portion of the supplemental content to the one or more predetermined locations in the first default content using a bit-block technique.

11. A method for use by a system including a processing hardware and a memory storing a software code, the method comprising:
    receiving, by the software code executed by the processing hardware, a content stream including a plurality of video frames each having at least one of a default content or a supplemental content, and encoded metadata including a metadata header portion and a metadata body portion, wherein the metadata header portion is embedded in same location within each of the plurality of video frames, wherein the metadata body portion is randomly located within each of the plurality of video frames on a per-frame basis, and wherein a first video frame of the plurality of video frames includes a first default content, a first supplemental content, and first encoded metadata;

decoding, by the software code executed by the processing hardware, the first encoded metadata of the first video frame to produce a first decoded metadata;

selecting, by the software code executed by the processing hardware and using the first decoded metadata, at least a first portion of the first supplemental content for use in enhancing the first default content;

transferring, by the software code executed by the processing hardware and using the first decoded metadata, the selected first portion of the supplemental content to one or more predetermined locations in the first default content to produce an enhanced first video content; and outputting, by the software code executed by the processing hardware, the enhanced first video content to a display device.

12. The method of claim 11, wherein the first portion of the first supplemental content is selected based on a display property of the display device.

13. The method of claim 12, wherein the display property comprises at least one of a display resolution or an aspect ratio of the display device.

14. The method of claim 11, wherein the first portion of the first supplemental content is selected based on an input received from a user of the display device.

15. The method of claim 11, wherein the first encoded metadata is a binary code.

16. The method of claim 11, wherein the system further comprises the display device, the method further comprising:
rendering, using the processing hardware, the enhanced first video content on the display device.

17. The method of claim 11, wherein the system is one of a tablet computer, a smart toy, a smartphone, or a wearable communication device.

18. The method of claim 11, wherein the first encoded metadata include instructions for modifying a second video frame of the plurality of video frames.

19. The method of claim 11, wherein a second video frame of the plurality of video frames includes a second default content, a second supplemental content, and second encoded metadata, the method further comprising:
decoding, by the software code executed by the processing hardware, the second encoded metadata of the second video frame to produce a second decoded metadata;

selecting, by the software code executed by the processing hardware and using the second decoded metadata, at least a second portion of the second supplemental content for use in enhancing the second default content;

transferring, by the software code executed by the processing hardware and using the second decoded metadata, the selected second portion of the second supplemental content to one or more predetermined locations in the second default content to produce an enhanced second video content; and outputting, by the software code executed by the processing hardware, the enhanced second video content to the display device.

20. The method of claim 11, wherein transferring the selected first portion of the supplemental content to the one or more predetermined locations in the first default content is performed using a bit-block technique.

* * * * *